United States Patent
Ohnishi et al.

(10) Patent No.: US 6,553,845 B2
(45) Date of Patent: Apr. 29, 2003

(54) CORIOLIS FLOWMETER UTILIZING THREE-FORKED PLATE VIBRATOR MODE

(75) Inventors: Kazumasa Ohnishi, 121-35, Hanazonohigashi 2-chome, Nagaoka-shi Niigata (JP), 940-0846; Yoshiro Tomikawa, Yonezawa (JP)

(73) Assignee: Kazumasa Ohnishi (JP)

(*) Notice: Subject to any disclaimer, the term of this patent is extended or adjusted under 35 U.S.C. 154(b) by 0 days.

(21) Appl. No.: 09/860,519

(22) Filed: May 21, 2001

(65) Prior Publication Data
US 2001/0045133 A1 Nov. 29, 2001

(30) Foreign Application Priority Data
May 19, 2000 (JP) ........................................ 2000-186976

(51) Int. Cl.$^7$ ................................................. G01F 1/78
(52) U.S. Cl. ................................................. 73/861.355
(58) Field of Search ...................... 73/861.355–861.357

(56) References Cited

U.S. PATENT DOCUMENTS

| | | | | |
|---|---|---|---|---|
| 4,444,059 A | * | 4/1984 | Smith ..................... | 73/861.354 |
| 4,899,588 A | * | 2/1990 | Titlow et al. ......... | 73/861.354 |
| 5,048,349 A | * | 9/1991 | Wolff .................... | 73/861.354 |
| 5,230,254 A | * | 7/1993 | Craft ..................... | 73/861.38 |
| 5,351,561 A | * | 10/1994 | Wenger et al. ........ | 73/861.354 |
| 5,691,485 A | * | 11/1997 | Endo et al. ............ | 73/861.357 |
| 5,892,159 A | * | 4/1999 | Smith .................... | 73/861.354 |
| 6,058,787 A | * | 5/2000 | Hughes .................. | 73/861.63 |
| 6,308,580 B1 | * | 10/2001 | Crisfield et al. ...... | 73/861.355 |

* cited by examiner

Primary Examiner—Max Noori
Assistant Examiner—Charlene Dickens
(74) Attorney, Agent, or Firm—Nixon Peabody LLP; Jeffrey L. Costellia

(57) ABSTRACT

A highly sensitive Coriolis flowmeter, which is also utilizable as a density meter, is composed of:
  a substrate having two conduits through which a fluid to be measured flows;
  a curved tube fixed to the substrate in such manner that one end connects with one conduit and another end connects with another conduit;
  two curved rods having a curve identical to the curve of the curved tube each of which is fixed to the substrate on each side in parallel with the curve tube with a space;
  vibrators attached to the tube and rods which generate vibrations in such manner that the tube and rods vibrate in opposite phase; and
  a sensor for detecting variation of vibration of the tube which is caused by a Coriolis force occurring when a fluid flows through the tube.

12 Claims, 5 Drawing Sheets

(a)  (b)

(a)

(b)

CORIOLIS FLOWMETER UTILIZING THREE-FORKED PLATE VIBRATOR MODE

FIELD OF THE INVENTION

The invention relates to a Coriolis flowmeter and further relates to a density meter utilizing the Coriolis flowmeter.

BACKGROUND OF THE INVENTION

The Coriolis flowmeter is know as a direct mass flowmeter which is designed to work under the known principle that when a tube through which a fluid to be measured flows is vibrated, a Coriolis force which is proportional to the mass flow rate is generated to give a certain effect to the movement of vibrating fluid. Generally, the Coriolis force is detected in terms of an elastic deformation or distortion of the tube.

Since the Coriolis force is small as compared with the applied vibration force, it is required to provide a force measurement system to accurately detect the generated Coriolis force with high sensitivity. Therefore, a representative Coriolis flowmeter is designed to have a U-shaped conduit so that an enlarged deformation can be detected. However, the U-shaped conduit has a disadvantageous feature in that the fluid flowing through the U-shaped tube is apt to undergo a pressure loss. Nevertheless, Coriolis flowmeters having U-shaped tube have been widely employed because they have high sensitivity when they are appropriately designed.

U.S. Pat. Nos. 4,192,184 and 4,311,054 describe a Coriolis flowmeter having two U-shaped flow loops, a vibrator, and a sensor.

Japanese Patent Provisional Publication 59-92314 (corresponding to U.S. Ser. No. 439,035) illustrates a Coriolis flow meter such as that illustrated in FIG. 6, which has a manifold a two U-shaped tubes through each of which a fluid to be measured in connection with its flow rate flows in parallel.

The Coriolis flowmeter is vibrated by the vibration generator in the primary flexural vibration in which the nodes are placed on the support blocks at both ends of the flow tube. The Coriolis force FC is expressed as follows:

$$Fc = -2m[\omega] \times [v]$$

[in which, $[\omega]$ is a vector of $\omega$ (frequency) and $[v]$ is a vector of v (flow rate)].

The present inventor has discovered that the conventional Coriolis flowmeter having plural flow tube type cannot show enough sensitivity.

It is an object of the invention to provide a mass flowmeter of curved tube type utilizing the Coriolis force which is improved in its sensitivity.

It is another object of the invention to provide a density meter utilizing the improved Coriolis flowmeter.

SUMMARY OF THE INVENTION

The present invention resides in a Coriolis flowmeter comprising:

a substrate having a pair of conduits through which a fluid to be measured in connection with a flow rate thereof flows;

a curved tube fixed to the substrate in such manner that one end connects with one of the conduits and another end connects with another of the conduits;

a pair of curved rods having a curve identical to the curve of the curved tube each of which is fixed to the substrate on each side in parallel with the curved tube with a space;

vibration generating meant attached to the curved tube and each of the curved rods which generate vibrations in such manner that the curved tube and the curved rods vibrate in opposite phase; and a sensor means detecting variation of vibration of the curved tube which is caused by a Coriolis force occurring when a fluid flows through the curved tube.

The invention further resides in a Coriolis flowmeter comprising:

a substrate having a pair of colts through which a fluid to be measured in connection with a flow rate thereof flows;

a first curved tube, a second curved tube, and a third curved tube all of which are fixed to the substrate in parallel to each other in such manner that one end of the first tube connects with one of the conduits, another end of the first tube connects with one end of the second tube through a conduit arranged in or under the substrate, another end of the second tube connects with one end of the third tube through a conduit arranged in or under the substrate, and another end of the third tube connects with another of the conduits under the condition that the fluid flows in the three curved tube a direction identical to each other;

vibration generating means attached to the curved tubes which generate vibrations in such manner that the neighboring tubes vibrate in opposite phase; and a sensor means detecting variation of vibration of the second tube which is caused by a Coriolis force occurring when a fluid flows through the curved tube.

The Coriolis flowmeter of the invention can also be utilized as a density meter.

DETAILED DESCRIPTION OF THE INVENTION

The present invention is further described by referring to the figures given in the attached drawings.

Figure 1:
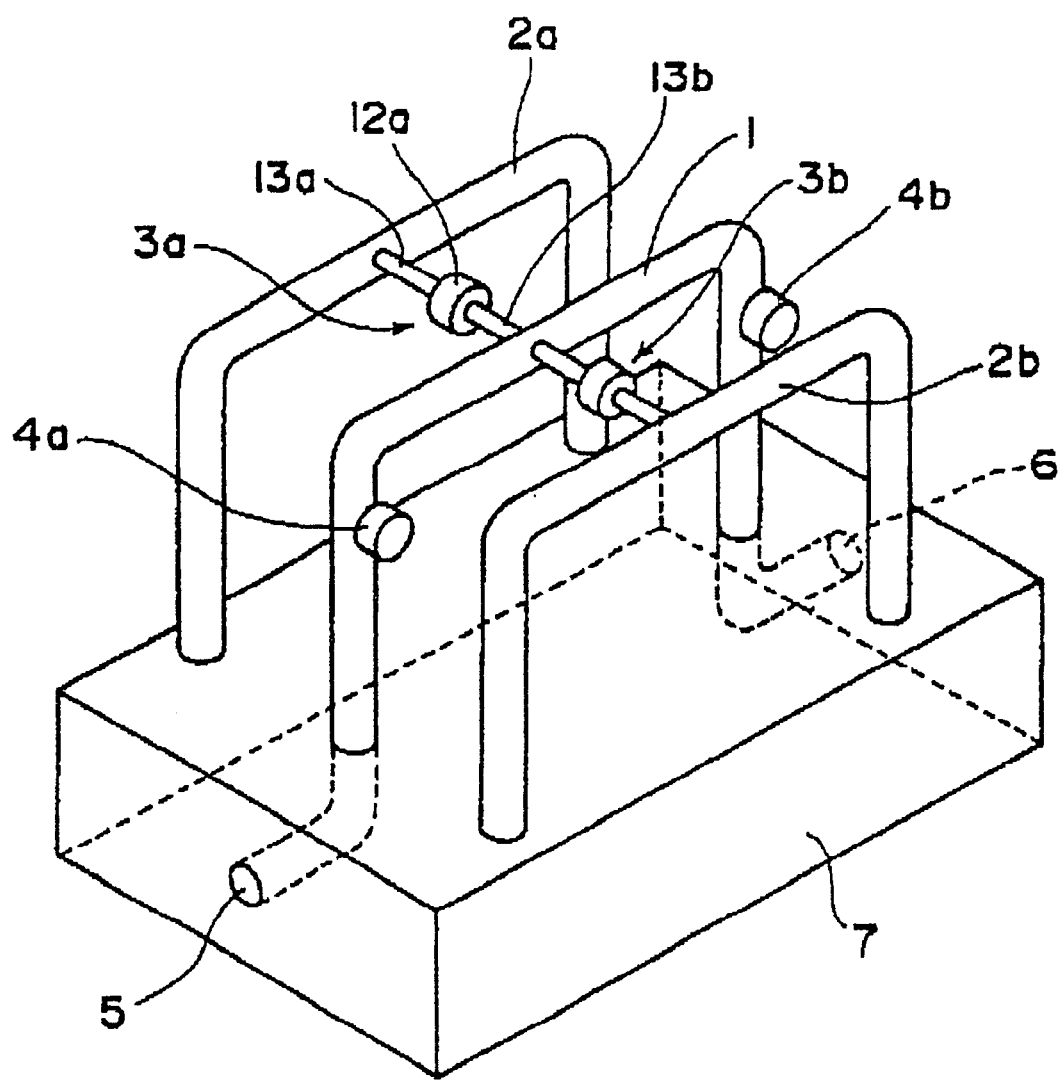
FIG. 1 is a schematic view of a Coriolis flowmeter according to the invention.

FIG. 1 is a schematic view of a Coriolis flowmeter according to the invention.

The flowmeter of the invention comprise the following members.

(1) A substrate 7 having a pair of conduits through which a fluid to be measured in connection with a flow rate thereof flows. Each of the conduits has an opening 5, 6 which connects with an outer fluid-flowing system. The conduits can be embedded in the substrate 7 or provided under the substrate 7.

(2) A curved tube 1 fixed to the substrate 7 in such manner that one end connects with one of the conduits and another end connects with another of the conduits.

(3) A pair of curved rods or poles 2a, 2b having a curve identical to the curve of the curved tube 1. Each of the curved rods 2a, 2b is fixed to the substrate 7 on each side in parallel with the curved tube 1 with a space (4) Vibration generating means 3a, 3b attached to the curved tube 1 and each of the curved rods 2a, 2b. The vibration generating means 3a, 2b generate vibrations in such manner that the curved tube 1 and the curved rods 2a, 2b vibrate in opposite phase. The vibration generating means 3a, 3b is generally composed of a coil 12a and a magnet 13a. Otherwise, the vibration generator means comprises a piezoelectric element or a generator utilizing static electricity.

(5) A sensor means 4a, 4b detecting variation of vibration of the curved tube 1 which is caused by a Coriolis force occurring when a fluid flows through the curved tube 1. The sensor means is generally composed of a coil and a magnet. Otherwise, the sensor means comprises a piezoelectric element or a generator utilizing static electricity.

In the Coriolis flowmeter of FIG. 1, the curved rods 2a, 2b are preferably identical to each other, and each of the curved rods 2a, 2b is preferably apart from the curved tube 1 at the same space. Each of the curved rods 2a, 2b is preferably identical to the curved tube 1 in shape.

Each of the curved tube 1 and curved rods 2a, 2b preferably have a U-shape, such as that illustrated in FIG. 1. Each of the curved rods 2a, 2b preferably is in the form of a tube in which a fluid identical to the fluid to be measured is placed.

The substrate 7 preferably is in the form of a plate which has a thickness as much as twice or more the diameter of the curved tube 1.

Figure 2:
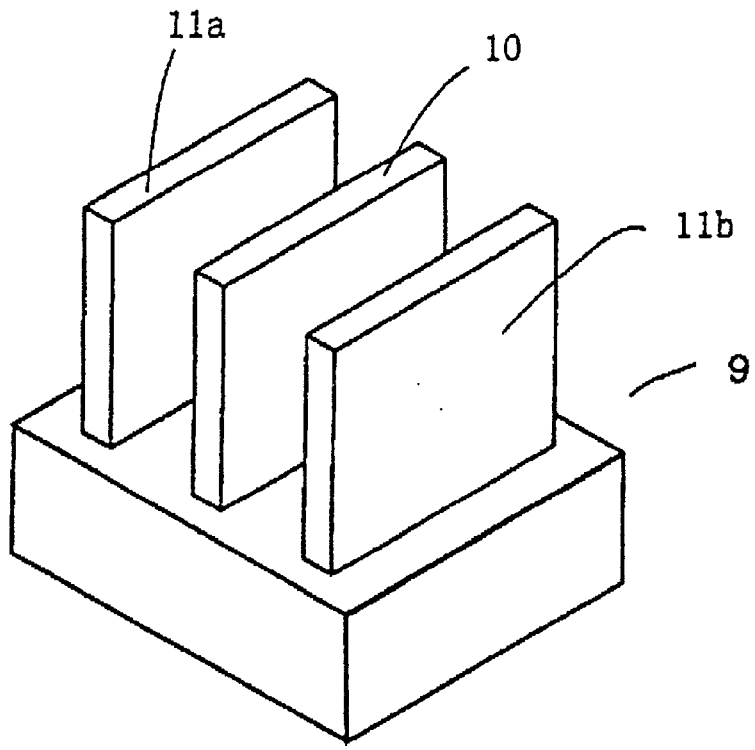
FIG. 2 is a schematic view of a three-forked plate vibrator which explains the principles of the Coriolis flowmeter of the invention.
Figure 3:
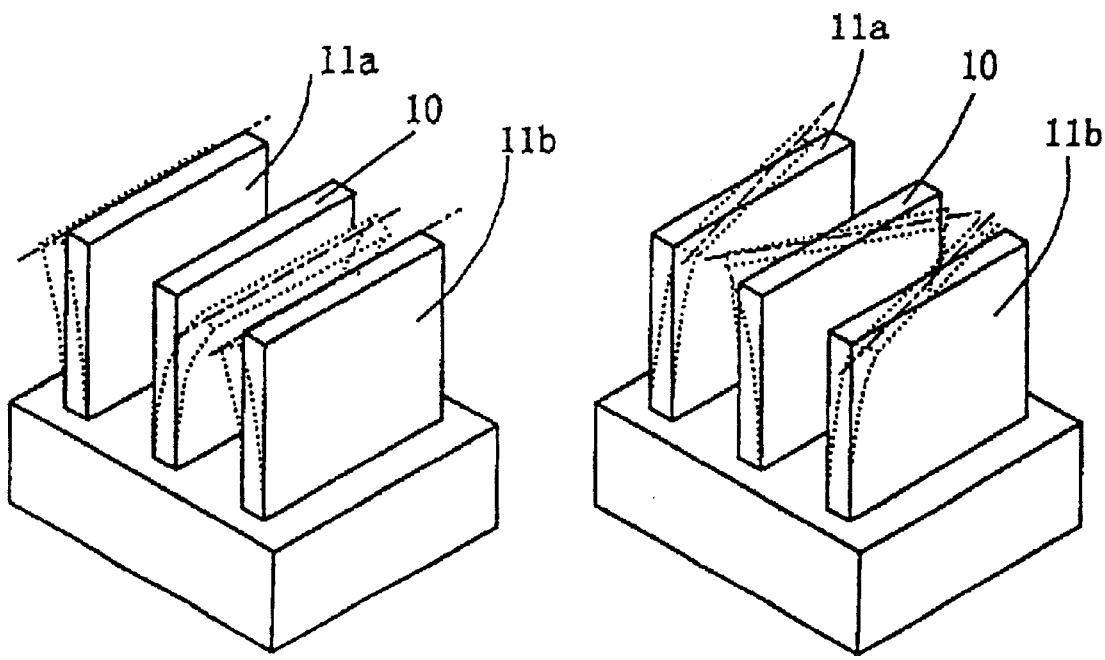
In FIG. 3, (a) shows a primary flexural vibration mode of the three-forked vibrator, and (b) shows a primary twisting vibration mode of the three-forked vibrator.
Figure 4:
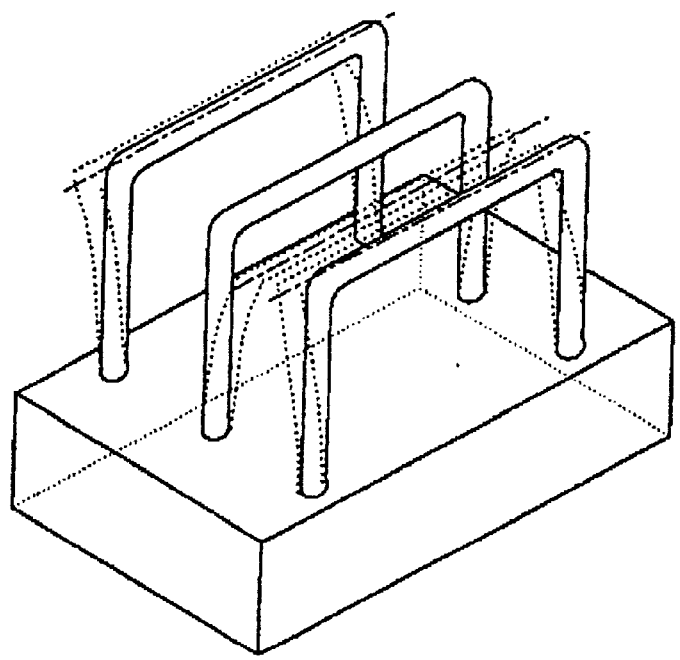
In FIG. 4, (a) shows a driving vibration mode of the flowmeter of FIG. 1, and (b) shows a detecting vibration mode of the same flowmeter.
Figure 4:
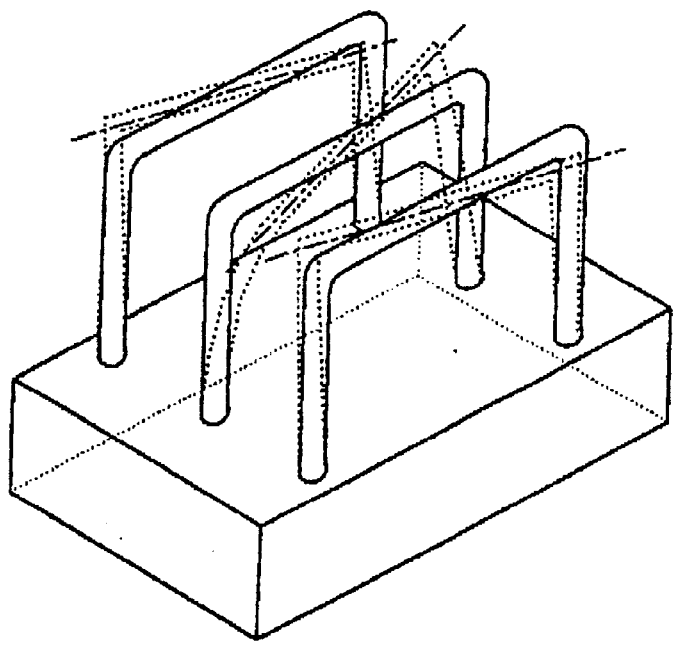

The principle on which the Coriolis flowmeter of FIG. 1 works is explained by referring to FIG. 2, FIGS. 3-(a) and (b), an FIGS. 4-(a) and (b).

The three-forked plate vibrator of FIG. 2 having a substrate 9 and a three arm, that is, a center arm 10, and each of side arms 11a, 11b is now utilized as a reliable resonator.

The primary flexural vibration mode of the resonator of FIG. 2 is illustrated in FIG. 3-(a). If the center arm 13 have a mass and a shape identical to those of the side arms 11a, 11b, and the center arm 10 and the side arms 11a, 11b vibrate in opposite phase, the center arm 10 vibrates with a displacement twice as much as those of the side 11a, 11b, as is illustrated in FIG. 3-(a) with dotted lines. Each of the chain line with dots means the displacement of the top of each arm.

The primary twisting vibration mode of the resonator of FIG. 2 is illustrated in FIG. 3-(b). If the center arm 10 have a mass and a shape identical to those of the side arms 11a, 11b, and the center arm 10 and the side arms 11a, 11b vibrate in opposite phase, the center arm 10 vibrates with a twisted displacement twice as much as those of the side arms 11a, 11b, as is illustrated in FIG. 3-(b) with dotted lines. Each of the chain line with dots means the displacement of the top of each arm.

The Coriolis flowmeter of the invention functions on the principle illustrated in FIGS. 3-(a) and (b), as illustrated in FIGS. 4-(a) and (b).

The vibration generating means 3a, 3b of FIG. 1 work to give vibrations in the manner illustrated in FIG. 4-(a). The movements of vibration are described below:

(1) The curved rod 2a attracts the curved tube 1, while the curved rod 2b repels the curved tube 1.

(2) The curved rod 2b attracts the curved tube 1, while the curved rod 2a repels the curved tube 1.

The movements (1) and (2) take place alternately.

Each of the chain line with dots means the displacement of the top of each arm.

The detecting vibration mode is illustrated in FIG. 4-(b). When a fluid flows through the curved tube 1 of FIG. 1, a Coriolis force occurs in the tube 1 (i.e., center tube) so that the curved tube 1 vibrates in the twisting vibration node as is illustrated in FIG. 4-(b). Each of the curved rods 2a, 2b which is placed on each side of the curved tube 1 also vibrates in the twisting mode. The tube 1 (center tube) vibrates with a twisted displacement twice as much as those of the side rods 12a, 12b, as is illustrated in FIG. 4-(b) with dotted lines. Each of the chain line with dots means the displacement of the top of the center tube and the side rods. The detection is performed by measuring the doubled displacement of the center tube, so as to detect the flow rate with increased sensitivity.

Figure 5:
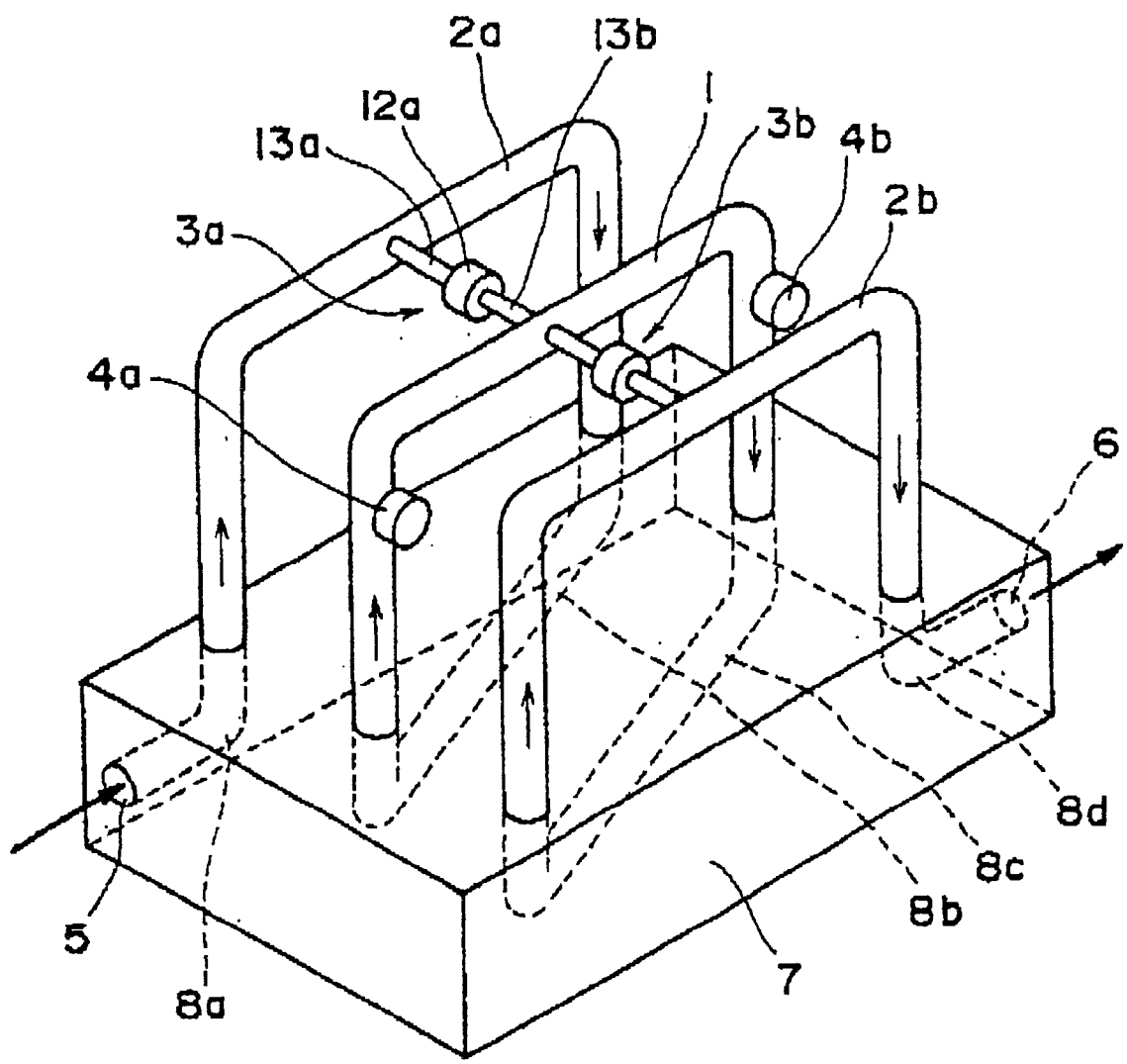
FIG. 5 is a schematic view of another Coriolis flowmeter according to the invention.
Figure 6:
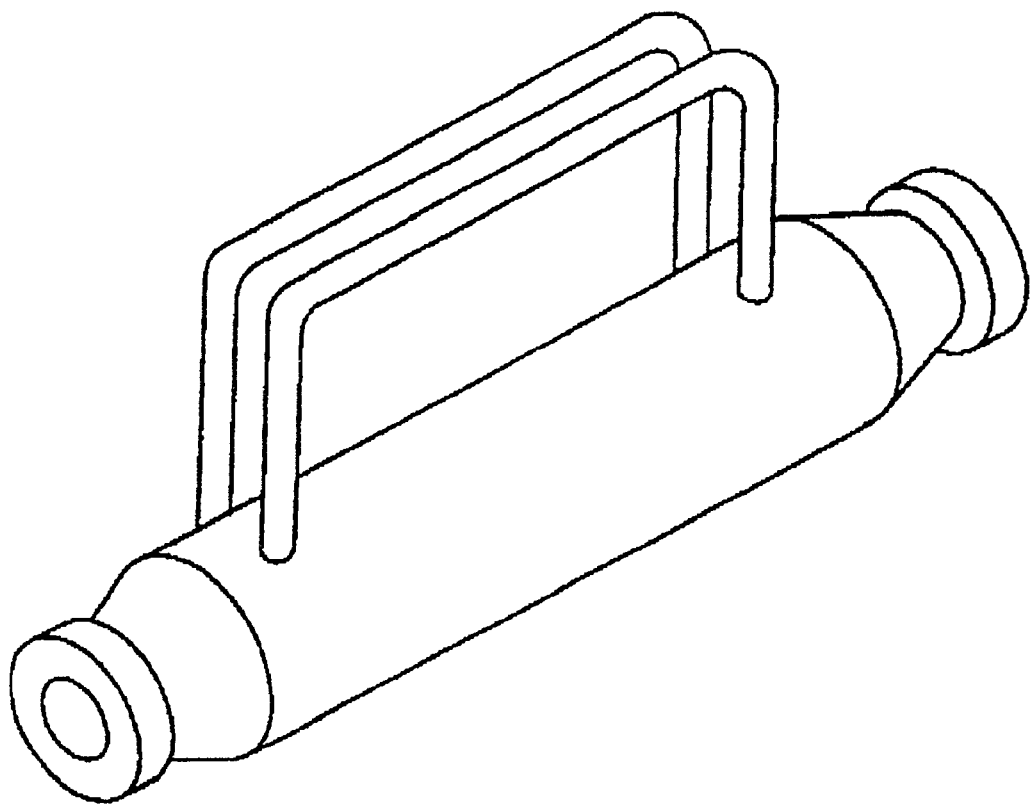
FIG. 6 shows an example of the known Coriolis flowmeter having plural flowmeters.

The Coriolis flowmeter of the invention can have the structure illustrated in FIG. 5. The flowmeter of FIG. 5 has the following elements.

(1) A substrate 7 having a pair of conduits 8a, 8d through which a fluid to be measured in connection with a flow rate thereof flows. Each of the conduits 8a, 8d has an opening 5, 6, respectively, which connects with an outer fluid-flowing system. The conduits 8a, 8d can be embedded in the substrate 7 or provided under the substrate 7.

(2) A first curved tube 2a, a second curved tube 1, and a third curved tube 2b. All curved tubes 2a, 1, 2b are fixed to the substrate 7 in parallel to each other in such manner that one end of the first tube 2a connects with the conduit 8a, another end of the first tube connects 2a with one end of the second tube 1 through a conduit 8b arranged in the substrate 7, another end of the second tube 1 connects with one end of the third tube 2b through a conduit 8c arranged in the substrate 7, and another end of the third tube 2b connects with the conduit 8d under the condition that the fluid flows in the three curved tube 2a, 1, 2b in a direction identical to each other, as illustrated in FIG. 5. The conduits 8c, 8d can be embedded in the substrate 7 or provided under the substrate 7.

(3) Vibration generating means 3a, 3b attached to the curved tubes 2a, 1, 2b which generate vibrations in such manner that the neighboring tubes vibrate in opposite phase. The vibration generating means 3a, 3b is generally composed of a coil 12a and a magnet 13a.

(4) Sensor means 4a, 4b which detect variation of vibration of the second tube 1 which is caused by a Coriolis force occurring when a fluid flows through the curved tube 1.

The flowmeter of FIG. 5 has a sensitivity higher than that of the flowmeter of FIG. 1, because Coriolis force occurs not only in the center tube (second tube 1) but also in the side tubes (first and third tubes 2a, 2b) and the twisting vibration of the center tube is multiplied by the twisting vibrations of the side tubes.

In the Coriolis flowmeter of FIG. 5, each of the curved tubes 2a, 1, 2b is preferably equivalent to each other, and the neighboring tubes 2a and 1, and the neighboring tubes 1 and 2b are apt from each other at the same space. Each of the curved tubes 2a, 1, 2b preferably has a U-shape. The substrate 7 preferably is in the form of a plate which has a thickness as much as twice or more the diameter of the second curved tube 1.

The substrate, curved tube, and curved rod are generally made of metallic material such as stainless steel, Hastelloy (trade name), or titanium alloy. In the case that the substrate has enough thickness, the flowmeter of the invention gives a flow rate with increase accuracy because the vibration of the curved tube of the flowmeter is effectively isolated from any vibration occurring in the surroundings.

The curved tubes and curved rods may have a triangle shape, a circle having a narrow neck portion.

What is claimed is:

1. A Coriolis flowmeter which vibrates in a mode of three-forked plate vibration comprising:
   one substrate having a pair of conduits through which a fluid to be measured in connection with a flow rate thereof flows;
   a curved tube fixed to the substrate in such a manner that one end connects with one of the conduits and another end connects with another of the conduits so that the fluid to be measured flows therethrough;
   a pair of curved rods through which the fluid to be measured does not flow, the pair of curved rods having a curve identical to the curve of the curved tube each of which is fixed to the substrate on each side in parallel with the curved tube with a space therebetween;
   vibration generating means attached to the curved tube and each of the curved rods which generate vibrations in such a manner that the curved tube and the curved rods vibrate in opposite phases; and
   a sensor means for detecting a variation of the vibration of the curved tube which is caused by a Coriolis force occurring when the fluid flows through the curved tube.

2. The Coriolis flowmeter of claim 1, wherein the curved rods are identical to each other.

3. The Coriolis flowmeter of claim 1, wherein each of the curved rods is apart from the curved tube at the same space.

4. The Coriolis flowmeter of claim 1, wherein each of the curved rods is identical to the curved tube in shape.

5. The Coriolis flowmeter of claim 1, wherein each of the curved tube and curved rods have a U-shape.

6. The Coriolis flowmeter of claim 1, wherein each of the curved rods is in the form of a tube in which a fluid identical to the fluid to be measured is placed.

7. The Coriolis flowmeter of claim 1, wherein the substrate is in the form of a plate which has a thickness as much as twice or more the diameter of the curved tube.

8. A Coriolis flowmeter which vibrates in a mode of three-forked plate vibration comprising:
   one substrate having conduits through which a fluid to be measured in connection with a flow rate thereof flows;
   a first curved tube, a second curved tube, and a third curved tube all of which are fixed to the substrate in parallel to each other in such a manner that one end of the first tube connects with one of the conduits, another end of the first tube connects with one end of the second tube through a conduit arranged in or under the substrate, another end of the second tube connects with one end of the third tube through a conduit arranged in or under the substrate, and another end of the third tube connects with another of the conduits under a condition that the fluid flows in the three curved tubes in a direction identical to each other;
   vibration generating means attached to the curved tubes which generate vibrations in such a manner that the neighboring tubes vibrate in opposite phases; and
   a sensor means for detecting a variation of vibration of the second tube which is caused by a Coriolis force occurring when the fluid flows through the second curved tube.

9. The Coriolis flowmeter of claim 8, wherein each of the curved tubes is equivalent to each other.

10. The Coriolis flowmeter of claim 8, wherein the neighboring tubes are apart from each other at the same space.

11. The Coriolis flowmeter of claim 8, wherein each of the curved tubes has a U-shape.

12. The Coriolis flowmeter of claim 8, wherein the substrate is in the form of a plate which bas a thickness as much as twice or more the diameter of the second curved tube.

* * * * *